United States Patent Office 2,943,072
Patented June 28, 1960

2,943,072
METHOD OF CONTROLLING THE GELATION OF FILLED DIISOCYANATE MODIFIED POLYESTER

Alan K. Forsythe, Manor Township, Lancaster County, Pa., assignor to Armstrong Cork Company, Lancaster, Pa., a corporation of Pennsylvania No Drawing. Filed Mar. 15, 1955, Ser. No. 494,549

6 Claims. (Cl. 260—40)

This invention relates generally to polyesters, and more particularly to diisocyanate modified polyesters. Still more particularly it relates to a method of gelling a diisocyanate modified polyester which improves the handling and control of the gelled product.

Unmodified linear polyesters have found very limited commercial application. It is usually impossible to obtain high enough molecular weights and at the same time sharp molecular weight distribution, which are requisite of permanent and excellent mechanical properties by direct polycondensation.

To overcome the shortcomings of unmodified polyesters, special technics, such as high vacuum technics, are often required. Additional methods of overcoming the shortcomings of unmodified polyesters involve the use of various polyisocyanates, particularly diisocyanates. Diisocyanate modifications of reactive end group terminated linear polyesters have been the subject of intensive investigation over the past few years. Under certain conditions, low molecular weight linear polyesters can be made to react very rapidly with polyisocyanates, in particular aromatic polyisocyanates, to yield high molecular weight polymers.

The usual method of treating a given polyester with a given diisocyanate is simply to add the requisite amount of diisocyanate to the polyester, mix the two together thoroughly, and heat the mix to the gelling temperature. The amount of reactive diisocyanate is generally that amount approximately equivalent to the reactive terminal groups in the polyester. Such equivalencies can be calculated from the acid number and the hydroxyl number in ways described in the literature and long used by workers in the field.

The addition of the diisocyanate to the polyester causes both chain extension and cross linking, this latter occurring when an excess of diisocyanate is used. The end point of these two types of behavior is usually manifest by gelation of the diisocyanate modified polyester. Additional reaction can certainly take place subsequent to gelation, but by and large the gelling point measures the turning point at which the liquid polyester turns into a different physical state entirely.

The control of the reaction, while being brought to the gelling point with the aid of diisocyanates, has often been a difficult problem. The actual physical handling of the gel has caused a great deal of difficulty. The high viscosity and the adhesive properties of the gel render it extremely difficult to handle. Thus if the gel is formed in a kettle, gel losses are extremely high, since the gel is not readily removed from the kettle; large amounts of it adhere to the walls, agitator, and outlet. To overcome this difficult, systems have been derived wherein the polyester has been heated and agitated in the presence of a diisocyanate to a point just prior to the point where gelation occurs. The polyester has then been discharged from the kettle into trays or other containers and gelation has been then brought about in these secondary containers. The disadvantages of increased handling and difficulty of determining just when to remove the modified polyester from the kettle prior to gelation are apparent. In many applications, once the gel has been formed in the secondary containers, the gel must be removed and placed in a mixer of some kind in order that fillers and other ingredients may be compounded with the gel for many of the end uses which demand such fillers.

It is the primary object of the present invention to present a process for controlling the properties at the gel point of a diisocyanate modified polyester destined for a product which contains both the modified polyester and filler. Further objects and advantages will become apparent from the following description of the invention.

This object has been achieved in a surprisingly straightforward and effective manner. The diisocyanate is blended with the polyester and then the blend is admixed with a solid filler. The gelling reaction of said blend is then carried out on the surface of the filler.

Any of the polyesters that lend themselves to diisocyanate modification may be treated by the present invention. It is necessary only that the diisocyanate modified polyester be such as can be brought to the gelling point by known methods and that the end product contain solid filler. It can be seen that the amount of diisocyanate to be added to a polyester is not critical in the process of the present invention so long as the gelling reaction occurs. Thus the present invention has utility in that narrow field of polyester treatment where diisocyanates and polyesters are reacted together to form a gel, and which gel is destined for a further use which calls for a filler.

The polyisocyanates to be used are those compounds normally used to accomplish gelation in a polyester. Such compounds are well known to those skilled in the art. Exemplary of the diisocyanates are 2,4 toluene diisocyanates, hexamethylene diisocyanates, tetramethylene diisocyanates, 4,4′ diphenyl diisocyanates, 4,4′ diphenylene methane diisocyanates, dianisidene diisocyanates, 4,4′ tolidene diisocyanates, 1,5 naphthalene diisocyanate, 4,4′ diphenyl ether diisocyanate, and p-phenylene diisocyanate.

The dibasic carboxylic acids used to form the polyesters are well known and include, for example, succinic, glutonic, adipic, pimelic, suberic, azelaic, subacic, malonic, brassylic, tartaric, maleic, malic, fumaric, dilinoleic, thiodibuteric, diphenic, isophthalic, paraphthalic, hexadyroparaphthalic, tetrahydrophthalic, p-phenylene diacetic, dihydromuconic, and similar acids. To be reacted with the acid or acids are those glycols normally used including, for example, ethylene, propylene, 1,2 propylene, 1,3 diethylene, triethylene, butylene, pentamethylene, hexamethylene, tetramethylene, decamethylene, dodecamethylene, glycerine mono ethers, and thiodiglycol.

Diamines and amino alcohols having at least one hydrogen atom attached to the amino nitrogen atom may be used as a reactant in forming the polyester. Such reactants as the diamines and amino alcohols may sometimes be used to react with any excess diisocyanate in accordance with known procedures.

In practicing the process of the present invention, the selected diisocyanate must be added to the polyester and thoroughly blended therewith before combining with the filler. It has been found that if the fillers are present before the diisocyanate is added, the diisocyanate will not distribute well throughout the polyester and subsequent gelation and curing, as in the formation of flooring products, will produce exceedingly tough spots on the flooring surface. These spots result from the fact that an unusually large amount of diisocyanate remains at that spot.

Generally, the blending of the diisocyanate and the polyester presents no problem, since the blending may be carried out in any desirable way. Generally, it is preferable to heat the polyester to an elevated temperature less than the lowest reaction temperature in order to reduce its viscosity and to blend the diisocyanate at that elevated temperature.

Once the diisocyanate-polyester blend has been prepared, the filler may be admixed therewith. This step may be carried out in any desirable mixer, such as the Baker-Perkins mixers or the Readco mixers. The mixer should be steam jacketed to supply the heat necessary to cause the gelling reaction. Sigma blade agitators are preferable, but other known types may be used. Since many of the diisocyanates possess toxic properties in varying degrees, it is preferred that covered mixers be used and that good ventilation is available.

A preferred embodiment of the admixing operation is to place the fillers into the mixer, put steam pressure on the jacket, start the agitator, and heat the fillers for a period of time sufficient to drive off any moisture that might be present, since moisture reacts with the diisocyanates. At the elevated temperature, the previously blended mixture of diisocyanate and polyester may then be poured onto the agitated fillers at a suitable rate of addition.

As fillers, there may be mentioned as examples wood flour, slate flour, whiting, International fiber, asbestos, and ground limestone. Additionally, there may be utilized various pigments such as carbon black, titanium dioxide, zinc oxide, iron oxide, and the phthalocyanines, where the end use of the polyester-filler product calls for pigmentation.

Once the polyester-diisocyanate blend has been completely added to the fillers in the mixer, the reaction is allowed to proceed to the gelling point. Generally speaking, gelation will occur at a temperature in the range of about 180°–320° F., but the precise temperature will depend to a large extent on the particular polyester and the particular diisocyanate being used. It is one of the outstanding advantages of the present invention that the period of time for the gelling reaction to take place is not critical, since the reaction is allowed to run at the elevated temperature until the charge takes on the form of a dry, tacky crumb; the physical form serves as an end-point indicator. At that point, the gelling reaction is substantially complete and the gel-filler mixture may be easily discharged from the mixer to be processed as desired. It is readily apparent, then, that the present process eliminates the need for carefully checking the extent of the gelling reaction, since the presence of the fillers renders a concern about the progress of the reaction unnecessary. As gelation occurs, a dry crumb forms, so that gel handling, mixer cleaning, and reaction control problems have been eliminated.

In order that the mixer product will be in the form of a dry crumb easily dischargeable and easily handleable, the weight ratio of polyester:filler should not be greater than about 1.2:1. The exact ratio depends on the surface area of the fillers used. Decreasing the amounts of filler does not change the reaction; it increases the control and mixer cleaning problems. The upper limit is not critical, since even a polyester:filler ratio as low as 1:10 or lower can readily be handled so as to cause the gelling reaction to take place on the surface of the filler. Huge excesses of filler are workable but serve no useful purpose, since there is insufficient polyester present to bind the filler particles. Where the end product of the polyester-filler product is to be a flooring composition, it is generally preferred that the polyester:filler ratio during the gelling reaction be in the range of about 1:2 to 1:4, and preferably about 1:2.5.

As described above, not only is the gelling reaction completely controlled by carrying out the reaction on the surface of fillers, but losses of polyesters are greatly minimized. Since the mixer product is in the form of a dry, tacky crumb, substantially none of it adheres to the mixer or any other equipment. The product, furthermore, is easily handled in those steps leading up to subsequent processing. Furthermore, the present process renders completely unnecessary the step of dumping the diisocyanate modified polyester product prior to gelation and carrying out the gelling reaction in secondary containers such as trays or the like; all guessing is eliminated.

The following examples illustrate several embodiments of the invention. All parts are by weight unless otherwise stated.

*Example I*

Into a kettle equipped with an agitator was placed 2,500 parts of a polyester (tetramethylene adipate tetrahydrophthalate) which was heated to 260° F. with agitation. At that temperature, 110.2 parts 2,4 toluene diisocyanate was added and the mixture was maintained at 260° F. with agitation for 30 minutes. At the end of that time, the mixture was a thick, viscous liquid which was poured from the kettle into a greased pan and allowed to cool. The gelling reaction was completed by placing the polyester in the greased pan in an oven heated at 220° F. for a period of 12 hours.

The residual polyester remaining in the kettle could only be removed therefrom by soaking the kettle and all parts that have been in contact with the polyester in a mixture of acetone and methyl isobutyl ketone or strong caustic for 2 days.

This example illustrates a prior method of gelling a polyester.

*Example II*

Into a Readco mixer with 50 pounds of steam on the jacket was charged 18.32 parts whiting, 8.39 parts wood flour, and 11.45 parts International fiber. These fillers were blended for 10 minutes to drive off any water.

In a separate mixer there was mixed 16 parts of the polyester described in Example I and 2.48 parts 2,4 toluene diisocyanate. After the 10-minute preheat of the filler, the polyester-diisocyanate blend was poured into the mixer during agitation. Reaction was continued for 30 minutes at a reaction temperature of approximately 280° F. At the end of that time, the mixture was composed completely of soft lumps with a slight amount of tack which was insufficient to cause the lumps to stick either to the mixer or to themselves.

The mix was discharged from the mixer, leaving the mixer clean.

*Example III*

Into a Baker-Perkins No. 4 mixer with 120 pounds steam on the jacket was charged 432 parts whiting, 198 parts wood flour, 270 parts International fiber, and the fillers were preheated for 5 minutes. A separate blend of 398 parts of the polyester described in Example I and 17.4 parts 2,4 toluene diisocyanate was carried out and the blend was poured on to the agitated and heated fillers. After 20 minutes, the mixer product had been converted into a dry crumb with a slight tack, which was readily discharged from the mixer.

This dry crumb was formulated into resilient flooring composition in a Banbury mixer. The composition was formed into resilient flooring in accordance with the usual technics, producing a flooring having excellent physical properties.

I claim:

1. The method of controlling the gelation of a diisocyanate modified polyester which comprises heating a solid filler to an elevated temperature to remove water therefrom, blending an organic diisocyanate wherein the sole reactive groups are isocyanate groups with a linear polyester containing hydrogen atoms reactive with said diisocyanate, heating said blend to a temperature of less than about 180° F. to maintain said blend in an ungelled state, adding said blend to said heated filler in an amount to provide a weight ratio of polyester to filler not greater than about 1.2:1, agitating the mixture of filler and polyester at an elevated temperature of between about 180°–320° F., and maintaining said conditions of agitation and temperature until said polyester has formed a gel on the surface of said filler.

2. The method according to claim 1 wherein the weight ratio of said polyester to said filler is in the range of about 1:2 to 1:4.

3. The method of controlling the gelation of a diisocyanate modified polyester which comprises blending an organic diisocyanate wherein the sole reactive groups are isocyanate groups with a linear polyester containing hydrogen atoms reactive with said diisocyanate in amounts sufficient to convert said polyester to a gel, heating said blend to a temperature of less than about 180° F. to maintain said blend in an ungelled state, heating fillers to a temperature in the range of about 180°–320° F., adding said blended polyester to said heated fillers, said polyester and said fillers being present in a weight ratio not greater than about 1.2:1, and agitating the resultant mixture at a temperature of between about 180°–320° F. until a dry, easily dischargeable crumb is formed.

4. The method of controlling the gelation of a diisocyanate modified tetramethylene adipate tetrahydrophthalate linear polyester which comprises blending said polyester with 2,4 toluene diisocyante, heating said blend to a temperature of less than about 180° F. to maintain said blend in an ungelled state, admixing said blend with a solid filler heated to remove water therefrom in a polyester:filler weight ratio not greater than about 1.2:1, and heating said mixture at a temperature of between about 180°–320° F. with agitation until the gelling reaction of said polyester has been carried out on the surface of said fillers.

5. The method of controlling the gelation of a diisocyanate modified polyester which comprises heating a solid filler to an elevated temperature to remove water therefrom, blending an organic diisocyanate wherein the sole reactive group are isocyanate groups with a linear polyester, heating said blend to a temperature of less than about 180° F. to maintain said blend in an ungelled state, said polyester containing hydrogen atoms reactive with said diisocyanate and being the reaction product of a dibasic carboxylic acid and a glycol, adding said blend to said heated filler in an amount to provide a weight ratio of polyester to filler not greater than about 1.2:1, agitating the mixture of filler and polyester at a temperature of between about 180°–320° F., and maintaining said conditions of agitation and temperature until said polyester has formed a gel on the surface of said filler.

6. The method of controlling the gelation of a diisocyanate modified polyester which comprises blending an organic diisocyanate wherein the sole reactive groups are isocyanate groups with a linear polyester in equivalent amounts to convert said polyester to a gel, heating said blend to a temperature of less than about 180° F. to maintain said blend in an ungelled state, said polyester containing hydrogen atoms reactive with said diisocyanate and being the reaction product of a dibasic carboxylic acid and a glycol, heating fillers to a temperature in the range of about 180°–320° F., adding said blended polyester to said heated fillers, said polyester and said fillers being present in a weight ratio of polyester to filler in the range of about 1:2 to 1:4, and agitating the resultant mixture at a temperature of between about 180°–320° F. until a dry, easily dischargeable crumb is formed.

References Cited in the file of this patent

UNITED STATES PATENTS

| | | |
|---|---|---|
| 2,333,639 | Christ et al. | Nov. 9, 1943 |
| 2,606,162 | Coffey et al. | Aug. 5, 1952 |
| 2,623,029 | Dearing et al. | Dec. 23, 1952 |
| 2,729,618 | Muller et al. | Jan. 3, 1956 |
| 2,751,363 | Martin | June 19, 1956 |